Dec. 23, 1969  T. K. PETERSEN  3,485,100

LIQUID-LEVEL MEASURING EQUIPMENT

Filed Jan. 17, 1968

United States Patent Office 3,485,100
Patented Dec. 23, 1969

3,485,100
LIQUID-LEVEL MEASURING EQUIPMENT
Tom Kastrup Petersen, Nordborg, Denmark, assignor to Danfoss A/S, Nordborg, Denmark, a company of Denmark
Filed Jan. 17, 1968, Ser. No. 698,452
Claims priority, application Germany, Jan. 26, 1967, D 52,108
Int. Cl. G01f 23/24
U.S. Cl. 73—295                              7 Claims

ABSTRACT OF THE DISCLOSURE

The invention relates to liquid level measuring equipment in which temperature dependent electrical resistor materials are utilized to sense the levels of liquids in containers. In one embodiment a resistor rod formed of a temperature dependent resistor material is mounted in a liquid container alongside a length of heating element having the same length as the resistor rod. The heating element heats the entire length of the resistor rod and thereby lowers the overall effective resistance of the resistor rod. As a liquid rises in the container, the submerged portion of the resistor rod is cooled by the liquid and the resistance of the submerged portion is raised, thereby raising the total effective resistance of the resistor rod.

Figure 1:
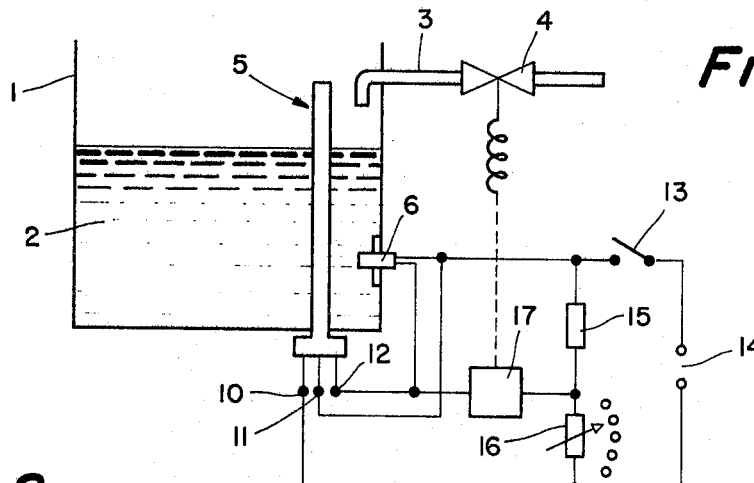

The temperature dependent resistor rod is a part of an electrical circuit designed so that variations in the resistance of the temperature dependent resistor rod cause other electrical apparatus to be actuated such as liquid level indicators or an electrically operated liquid control valve associated with the liquid container.

---

This invention relates to liquid-level measuring equipment having a heating element which is thermically coupled with a temperature-measuring member and from which heat can be removed by the liquid to be measured. This measuring equipment is suitable for measuring and indicating a large number of different liquid levels, for example in washing machines, heating-oil or petrol tanks, water-storage receptacles etc.

It is known to arrange a bimetal switch and a heating element side by side in the receptacle in which measurement is to be carried out. The heating element heats the bimetal switch in such manner that it assumes a deflected position. When liquid reaches and flows round this measuring means, reduced thermal output is transferred from the heating element to the bimetal switch so that the latter assumes another position. Consequently, a signal can be derived from the position of the bimetal switch when a certain level is reached. Such liquid-level measuring equipment however, is only suitable for indicating a single particular level. If it is required to measure several levels, a number of measuring means must be provided one above the other. This is quite expensive, especially as in many cases each measuring means necessitates the provision of an opening in the wall of the container. Continuous measurement of the level is not possible at all.

The object of the present invention is to provide liquid-level measuring equipment of the kind referred to, which, at little expense, enables several levels to be indicated and even permits of continuous indication.

According to the invention, this object is achieved by providing alongside each other an elongate heating element and a temperature-dependent resistor arrangement extending over the length of the heating element.

In that portion not submerged in the liquid, the resistor arrangement is heated by the heating element to a lesser extent than in that portion located below the level of the liquid. The resistance value of the series connection is therefore a definite measure of the level of the liquid.

The resistor arrangement can consist of a row of discrete temperature-dependent elements, for example one element at each level to be checked. The arrangement may be constructed from a number of series-connected temperature-dependent resistors, i.e. NTC or PTC resistors. A further possibility is that of connecting in series a number of resistors which are here bridged by a temperature-dependent switch. In the last-mentioned instance, only some of the resistors are electrically effective at a given time, since the other resistors are short-circuited by their temperature-dependent switch.

Instead of this, the resistor arrangement can however, also consist of an elongate temperature-dependent resistor element. Then, only a single resistor element is required, part of its length projecting from the liquid and the other part being submerged.

From the point of view of construction, it is recommended that use be made of a rod-like carrier, preferably of insulating material, which carries the heating element and the resistor arrangement. For this it suffices to provide a single orifice in the container for the liquid to be measured. In particular, the carrier can support the heating element and the resistor arrangement on its two sides, preferably as layers applied by sintering or vapour-deposition. The carrier will then have a low thermal resistance in the transverse direction and this permits of low-loss heating of the resistor arrangement. On the other hand, the thermal resistance is high in the longitudinal direction so that adjacent parts of the resistor arrangement are not affected in an undesirable manner.

Another advantageous construction consists in a rod of temperature-dependent resistor material which carries an insulating layer and a heating element layer on top of it. Here, the resistor arrangement of the heating element is protected against direct contact with the liquid, this enabling still clearer measuring results to be obtained.

The resistance of the resistor arrangement is preferably measured in a bridge connection. If the temperature conditions in the space in which the liquid-level is measured can fluctuate, either owing to outside influences or to changes in the temperature of the liquid to be measured (e.g. in the case of a washing machine) a reference resistor can be provided in the bridge connection for offsetting the temperature in the space in which the measurements are carried out.

A further concept of the invention which also offers advantages in the case of other liquid-level measuring equipment of the initially considered kind, consists in making the temperature-dependent resistor or a part thereof of a NTC material having a jump in the temperature-resistance characteristic curve. Examples of such materials are the semi-conducting oxides of the transition metals if they occupy a lower oxidation stage (of two or more oxidation stages). A typical representative that may be mentioned is vanadium oxide, $VO_2$. At a given temperature these materials exhibit a very pronounced jump in resistance. This can be utilised to accentuate the measuring signal, or to derive an additional signal. Thus, a resistor material of this kind can be used, for instance when, in addition to indicating a normal level in a petrol tank, the empty condition has also to be indicated by means of an additional signal and/or in a very positive manner.

Figure 2:
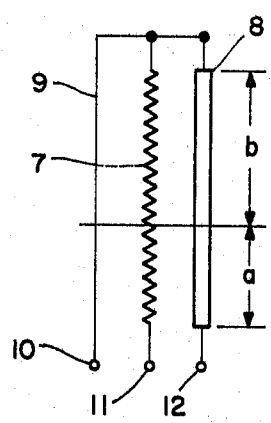
Figure 3:
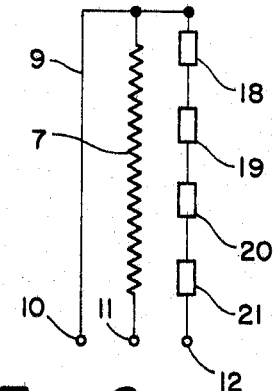
Figure 4:
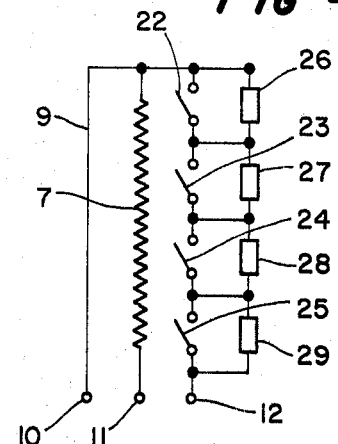
Figure 5:
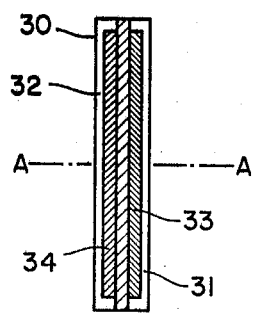
Figure 6:
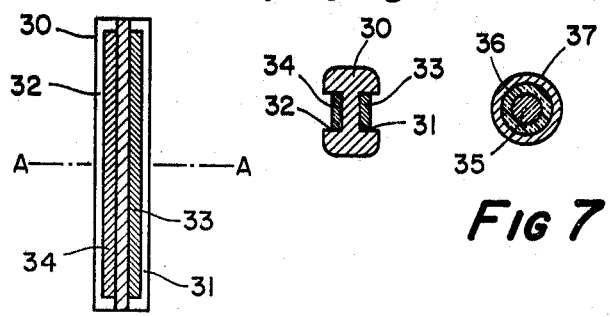
Figure 7:
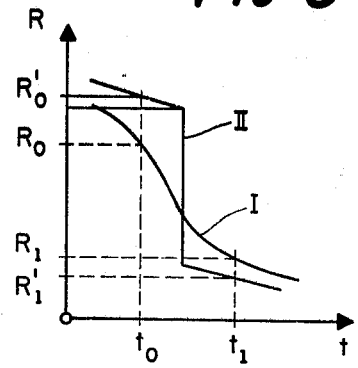

The invention will now be explained in more detail by reference to the drawing, wherein:

FIG. 1 is a schematic illustration of the liquid-level measuring equipment according to the invention, as used in a washing machine, FIG. 2 shows the connection for a first embodiment, FIG. 3 shows the connection for a second embodiment, FIG. 4 illustrates the connection for a third embodiment, FIG. 5 is a longitudinal section through a first construction, FIG 6 shows a cross-section on the line A—A of FIG. 5, FIG. 7 is a cross-section through a second construction, and FIG. 8 is a resistance-temperature graph for two different NTC materials.

FIG. 1 shows a container 1 filled with a liquid 2. The latter is supplied through a pipe 3 incorporating a magnetic valve 4. The liquid-level measuring equipment is in the form of a rod-shaped vertical element 5. A temperature-dependent compensating resistor 6 also projects into the container 1.

The rod-shaped element contains a heating resistor 7 extending over the length thereof, a resistor element 8 extending parallel therewith and a common conductor 9 (FIG. 2). Associated therewith are the output terminals 10, 11 and 12. The terminal 10 is connected directly to a current source 14 and the terminal 11 is connected thereto by way of a switch 13. The resistor element 8 is connected through the terminal 12 into a bridge connection in one branch of which is contained the temperature-dependent compensating resistor 6 and the temperature-dependent resistor element 8, while its other branch comprises a solid resistor 15 and an adjusting resistor 16. The diagonal contains a control unit 17 for direct or indirect actuation of the magnetic valve 4.

The resistor element 8 consists of a temperature-dependent material, particularly a material having NTC or PTC properties. FIG. 8 shows the resistance-temperature curves for two NTC resistor elements. Curve I relates to a NTC resistor, the resistance of which changes continuously with temperature, and curve II relates to a NTC resistor exhibiting a jump in the characteristic. It is assumed that in that part of the measuring equipment that is not covered by the liquid, the heating resistor 7 can heat the resistor element 8 to such an extent that the latter can assume the higher temperature $t_1$. Below the level of the liquid, however, so much heat is removed from the heating element by the liquid that the resistor element 8 can adjust only to the lower temperature $t_0$. Consequently, the resistor element 8 has a specific resistance $R_1$ or $R'_1$ in the portion free from liquid, and a specific resistance of $R_0$ or $R'_0$ in the portion covered by the liquid. The jump in resistance between the two temperatures can easily be of the order of $10^2$ and more.

When the length $a$ of the resistor element 8 is below the level of the liquid and the length $b$ is above it, the total resistance is simply obtained from $a \times R_0 + b \times R_1$. If, for example, the specific resistance $R_0$ is 100 ohm/cm. and the specific resistance $R_1$ is 1 ohm/cm., the total resistance is determined almost exclusively by the liquid-covered portion $a$. In the case of a 10 cm.-long element 5, the following relationships between liquid level and total resistance then occur:

| Liquid level (cm.): | Total resistance (ohm) |
|---|---|
| 1 | 901 |
| 2 | 802 |
| 3 | 703 |
| 4 | 604 |
| 5 | 505 |
| 6 | 406 |
| 7 | 307 |
| 8 | 208 |
| 9 | 109 |

Such differences in resistance can even be determined by means of simple measurements. The differences can be determined extremely accurately with the help of the bridge connection.

If, in the connection shown in FIG. 1, the adjusting resistor 16 has been set to a working point, water is brought in through the pipe 3 until a signal is received by way of the element 5 indicating that the liquid level to which the equipment has been set has been reached. The magnetic valve 4 is then closed. If the adjusting resistor 16 is set with the help of the programme-control gear, numerous levels can be determined with the help of liquid-level measuring equipment. Whilst the connection shown in FIG. 2 enables any required liquid level to be measured, in many cases it suffices to determine a certain number of definite levels. In the embodiment shown in FIG. 3, therefore, the resistor element 8 is replaced by four discrete series-connected separate resistors 18–21, which are fitted at vertical positions along the element 5 that correspond to the liquid levels in question. These resistors likewise consist of a temperature-dependent material and, in a characteristic manner, alter the total resistance of the series connection when their temperature changes as a result of their being wetted by the liquid.

In the embodiment shown in FIG. 4, bimetal switches 22–25 are associated with the heating resistor 7 and these are each bridged by the preferably similar resistors 26–29. When one of the bimetal switches is actuated, the associated resistor is short-circuited. Consequently, the total resistance of the series connection changes correspondingly.

In the embodiment shown in FIGS. 3 and 4, it suffices for the heating resistor 7 to be constituted of individual elements which are each associated with one of the resistors 18–21 or one of the bimetal switches 22–25.

FIGS. 5 and 6 illustrate the construction of an element 5. A rod 30 of insulating material contains two longitudinal grooves 31 and 32. A layer 33 of heating resistor material is inserted in the groove 31 and a layer 34 of a temperature-dependent resistor material is placed in the groove 32. The heating effect across the rod is very good because of the small thickness of material between the two grooves 31 and 32; on the other hand, the heat-transfer in the longitudinal direction is correspondingly poor on account of the small cross-sectional area.

In FIG. 7, a rod of temperature-dependent resistor material is surrounded by insulating material 36 to which is applied a cylindrical layer 37 of heating resistor material. Here, the temperature-dependent resistor is completely protected by the heating resistor against direct contact with the fluid to be measured.

The embodiments described can be modified in a large number of ways without departing from the basic thinking of the invention. For example, a rod-shaped element 5 can be inclined upwardly; longer portions of the heating resistor and the temperature-dependent resistor are then surrounded by liquid. As regards the connection technique employed, the heating resistor 7 can be separated completely electrically from the temperature-dependent resistors.

What is claimed is:

1. Liquid level measuring apparatus for operation with a Wheatstone bridge or the like, comprising, in combination, elongated temperature dependent electrical resistor means having an electrical resistance temperature coefficient, said resistor means having all portions thereof series connected, and heating element means in longitudinally extending spaced relation to said resistor means for heating said resistor means along the entire length thereof, a common conductor connected at one end thereof to adjacent ends of said resistor means and said heating element and having a terminal at the other end thereof, said resistor means and said heating element having terminals at their free ends respectively, said terminals being accessible for connection to a Wheatstone bridge or the like.

2. Apparatus according to claim 1 wherein said resistor means comprises a plurality of series connected temperature dependent resistors.

3. Apparatus according to claim 2 wherein adjacent ones of said resistors are bridged by a temperature responsive electrical switch.

4. Apparatus according to claim 1 wherein said resistor means consists of a single elongated temperature dependent resistor.

5. Apparatus according to claim 1 wherein said resistor means and said heating element means are fastened to and separated by a generally rod shaped carrier comprising an electrical insulating material.

6. Apparatus according to claim 1 including an electrical bridge circuit, said resistor means being an element in one branch of said bridge circuit, a temperature dependent resistor element in another branch of said bridge circuit for sensing the temperature of the liquid and thereby serving as a reference base in said circuit to compensate for variations in temperatures of liquids being measured.

7. Apparatus according to claim 1 wherein said resistor means comprises an NTC material having an abrupt change in rate in the temperature vs. resistance characteristic curve.

References Cited

UNITED STATES PATENTS

| 2,878,351 | 3/1959 | Polye | 338—23 |
| 2,930,232 | 3/1960 | Spears | 73—295 |
| 3,302,458 | 2/1969 | Scadron | 73—295 |

FOREIGN PATENTS 1,042,188  9/1966  Great Britain.

S. CLEMENT SWISHER, Primary Examiner

U.S. Cl. X.R.

338—23, 24